Figure 1:
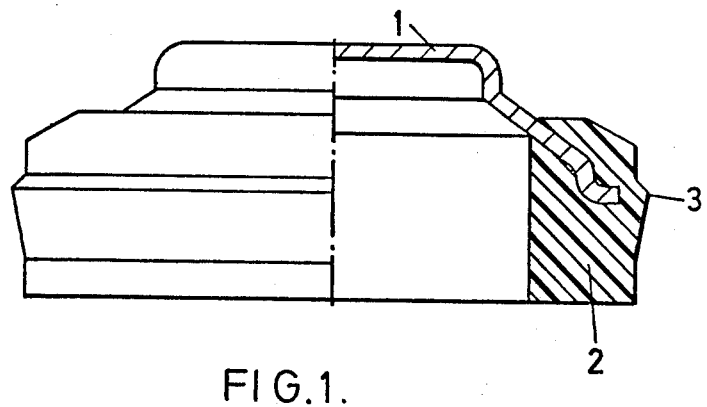

United States Patent [19]
Naylor et al.

[11] 3,904,438
[45] Sept. 9, 1975

[54] CLOSURE FOR ELECTROCHEMICAL CELLS

[75] Inventors: Denis Naylor; Frederick James Harris, both of Crawley, England

[73] Assignee: Mallory Batteries Limited, Crawley, England

[22] Filed: Apr. 8, 1974

[21] Appl. No.: 459,077

[30] Foreign Application Priority Data
Apr. 9, 1973 United Kingdom............... 17010/73

[52] U.S. Cl. ................................. 136/133; 136/169
[51] Int. Cl. ............................................. H01m 1/02
[58] Field of Search ........... 136/133, 169, 175, 107, 136/111, 163

[56] References Cited
UNITED STATES PATENTS
3,418,172  12/1968  Fletcher.............................. 136/111
3,476,610  11/1969  Krebs et al....................... 136/111 X
3,615,861  10/1971  Braem................................ 136/111
3,708,343   1/1973  Walsh................................. 136/133
3,827,916   8/1974  Fagan, Jr:........................ 136/107 X

*Primary Examiner*—Anthony Skapars

[57] ABSTRACT

Electrochemical cell having a metal housing, a metal top, and a resilient ring compressed between the edge region of the top and the internal surface of the housing, which edge ring embraces the edge region of the top, and has a peripheral annular projection on its radially outer surface which engages the internal surface of the housing, whereby the compressive sealing forces in the ring are localized in an annular region of the ring.

12 Claims, 2 Drawing Figures

CLOSURE FOR ELECTROCHEMICAL CELLS

This invention relates to electro-chemical cells and has especial reference to alkaline cells.

The efficient sealing of such cells is a continuing problem. Such cells commonly have a tubular or cup-shaped metal top, a sealing ring being trapped between edge regions of the top and the housing. For convenience the sealing ring commonly consists of thermoplastics material moulded about the edge region of the top. In existing alkaline cells, the top may for example consist of two nested dished metal discs whose edges are spaced apart, the moulded plastics sealing ring penetrating the gap between the edges of the discs. Alternatively, a single metal top disc may be used, with a convoluted rim. In both cases, the object is to create a long plastics-to-metal interface, so as to provide a long path for any electrolyte tending to seep out of the cell.

According to the present invention, we provide an electrochemical cell having a metal housing, a metal top, and a resilient sealing ring compressed between the edge region of the top and the internal surface of the housing, which edge ring embraces the edge region of the top, and has a peripheral annular projection on its radially outer surface which projection engages the internal surface of the housing whereby the compressive sealing forces in the ring are localized in an annular region of the ring.

Preferably the projection is substantially aligned, in the radial direction, with the edge of the top, so that the sealing forces are greatest in the annular region of the ring between the edge of the top and the housing. In practice these forces are applied to the sealing ring on closure of the cell.

A principal advantage of the invention is that the sealing forces are concentrated on a relatively small annular surface area of the peripheral surface of the ring.

Figure 2:
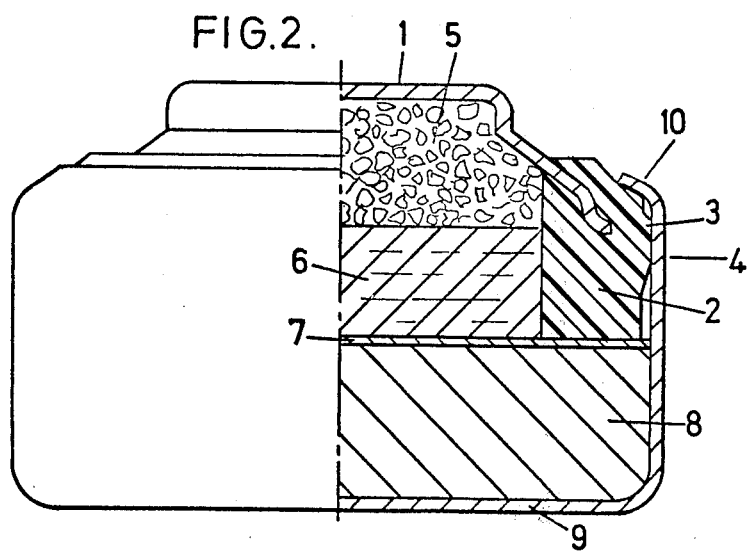

One convenient embodiment of the invention is illustrated by the drawings accompanying the provisional specification in which:

FIG. 1 is a side view, half in section of a composite top closure member for an alkaline cell; and FIG. 2 is a similar view of a completed cell.

The cell shown has a cup-shaped metal housing 9 containing a cathode depolarizer 8, a permeable barrier 7, an absorbent 6 containing an alkaline electrolyte, anode material 5, and a metal top closure disc 1. This disc is dished so that a portion stands above the top of the housing 9 in order to form an anode contact for the cell. The metal top is made of, or has on its internal surface a layer of, a material compatible with the anode material and electrolyte. The edge of the metal disc 1 lies within the upper region of the housing 9, and a theremoplastics sealing ring or collar 2 is injection moulded about the edge of the top disc. The top disc and sealing ring accordingly form an integral top closure member, as shown in FIG. 1, which facilitates handling during assembly of the cell.

Initially, the side wall of the housing 9 is rectilinear. The constituents of the cell are placed in the housing and the composite top closure member 1, 2 is fitted into the housing so that the sealing ring is trapped between the edge region of the disc 1 and the internal surface of the upper region of the wall of the housing 9. The edge 10 of the housing is then crimped inwardly so as to press down on the peripheral region of the top outer surface of the sealing ring.

As can be seen in FIG. 1, an annular projection 3 is provided on the external peripheral side surface of the sealing ring. The outermost diameter of this projection is greater than the internal diameter of the housing 9. Other regions of the said surface are of less diameter than the internal surface of the housing. Consequently, when the composite top closure member is inserted into the housing, the seal is subjected to radial compression localized in the radially outermost region of the projection 3. This region is aligned with the edge of the metal disc 1, which resists radial compression of the sealing ring, with the result that the annular region of the sealing ring between the edge of the disc 1 and the internal surface of the housing is under concentrated radial compression and in particular there is high radial pressure at the interface of the sealing ring and the internal surface of the housing, over a relatively small area 4 extending round the periphery of the sealing ring. This compression is independent of the pressure exerted on the sealing ring by the crimped edge of the housing.

We have found that the arrangement described provides very reliable sealing owing to the concentrated pressure between the sealing ring and the metal housing and top disc.

To facilitate insertion of the top closure member into the housing, the projection 3 preferably has a frusto-conical external surface tapering downwardly as seen in FIG. 1. Alternatively, the projection may have a convex arcuate axial cross-section.

The housing and top disc should be sufficiently rigid to ensure that the radial compression is maintained in the sealing ring, after sealing. Also, it is desirable that the operation of crimping the edge of the housing should not unduly reduce the radial pressure between the housing and the sealing ring in the area 4; it will be understood that the crimping tends to bow the housing onwards in the region below the crimp. Consequently, unless the housing is sufficiently rigid to resist this effect, it may be necessary to support the housing on its outer surface, e.g. by means of a shroud or collar, during the crimping of upper edge of the housing, to ensure that the internal diameter of the housing does not increase as a result of the crimping.

An advantage of the sealing arrangement described, in addition to the excellent sealing itself, is that the principal sealing pressure is radial and is localized in a particular region of the sealing ring. This means that the sealing pressure can be as great as desired, whereas in conventional sealing arrangements the sealing pressure is at least partly in the axial direction, and can impose excessive pressure on the constituents of the cell, in particular the barrier 7, and may cause fracture of the latter. In the arrangement described, the pressure on the cell constituents and in particular on the barrier depends on the force exerted during the crimping operation and can be controlled by control of the crimping force; consequently a relatively low pressure can be applied to the barrier, without detriment to the sealing of the cell.

A further advantage of the arrangement described is that the metal top is a single member only of relatively simple form, and can be made by simple pressing or drawing, and punching or clipping, techniques from metal strip. The only critical dimensions are the maximum external diameter of the metal top, the maximum external diameter of the sealing ring, and the concentricity of these two diameters to ensure that the maximum external diameter of the projection 3 is aligned with edge of the metal disc.

Although the invention is described with reference to a metal top consisting of a single disc, it can also be applied to a metal double top consisting of nested metal dished discs with spaced edges, the sealing ring penetrating between the latter as described above.

What we claim is:

1. An electrochemical cell having a metal housing, a metal top, and a resilient sealing ring compressed between the edge region of the top and the internal surface of the housing, which edge ring embraces the edge region of the top, and has a peripheral annular projection on its radially outer surface which projection engages the internal surface of the housing whereby the compressive sealing forces in the ring are localized in an annular region of the ring.

2. A cell as claimed in claim 1 wherein the projection is radially aligned with the edge of the top.

3. A cell as claimed in claim 1 wherein the maximum external diameter of the projection in the uncompressed state is greater than the internal diameter of the housing, and the sealing ring has external surface portions, on each side of the projection whose diameters are less than the internal diameter of the housing.

4. A cell as claimed in claim 3 wherein that portion of the projection which has the greatest external diameter is radially aligned with the edge of the top.

5. A cell as claimed in claim 1 wherein the projection has an external surface which tapers in the axial direction towards the interior of the cell.

6. A cell as claimed in claim 5 wherein the said external surface is frusto-conical.

7. A cell as claimed in claim 5 wherein the projection has a convex arcuate axial cross section.

8. A cell as claimed in claim 1 wherein the edge region of the housing is crimped over onto an axially outer surface of the sealing ring.

9. A cell as claimed in claim 1 wherein the metal top is a single dished metal disc.

10. A cell as claimed in claim 1 wherein the metal top consists of nested dished metal discs whose edges are spaced apart, the sealing ring penetrating the gap between the edges of the discs.

11. A cell as claimed in claim 1 wherein the sealing ring is of moulded plastics material.

12. A cell as claimed in claim 1 having an alkaline electrolyte.

* * * * *